Aug. 16, 1932.  C. H. MEEKER  1,872,317
APPARATUS FOR APPLYING REENFORCING TO FILM
Original Filed Aug. 6, 1927   3 Sheets-Sheet 1

Fig.1.

INVENTOR:
CHARLES H. MEEKER
By
ATTORNEY.

Patented Aug. 16, 1932

1,872,317

UNITED STATES PATENT OFFICE

CHARLES H. MEEKER, OF RIVERSIDE, CALIFORNIA

APPARATUS FOR APPLYING REENFORCING TO FILM

Original application filed August 6, 1927, Serial No. 211,107. Divided and this application filed October 20, 1928. Serial No. 313,884.

My invention relates to the motion-picture industry and more particularly to a novel machine for applying reenforcements to a motion-picture film, and is a division of my co-pending application filed August 6, 1927, Serial No. 211,107 entitled "Method of applying reenforcing to film."

In projecting motion pictures on a screen, a positive strip of film is used. This strip of film is wound on a reel and the projector unwinds it from this reel onto another, in the meantime projecting enlarged images of the picture in each frame of the film. These enlarged images are focused on the screen and appear in rapid succession. The film is driven intermittently by sprockets which engage the film through projections which enter sprocket holes on each side of the film and close to the edges thereof. The thin strip of film separating the sprocket holes and the edges is easily broken, and the useful life of a film is limited by this consideration.

I have found that by reenforcing the edges of the film with threads bonded thereto, the useful life of the film is increased many fold, in so far as the sprocket holes do not tear outward to the edge of the film. Such a reenforced film is the subject of my Patent No. 1,636,525, issued July 19, 1927, entitled "Reenforced moving picture film."

It is an object of my present invention to provide an apparatus for reenforcing motion-picture film.

Certain bonding materials are highly volatile and form explosive vapors when exposed to the air.

It is an object of my invention to provide an apparatus for removing such vapors from the vicinity of the machine.

It is a further object of my invention to provide an apparatus for condensing these vapors.

Certain bonding materials will not suitably adhere or cohere to the light-sensitive emulsion on the film itself, and it is often necessary to remove all traces of the emulsion from the faces adjacent to the edges of the film in order to give a clean bonding surface on the celluloid itself.

It is an object of my invention to provide an apparatus in which a portion of the emulsion on the film is removed before reenforcing members are applied.

It is sometimes desirable to allow the film to dry under tension after the reenforcing members have been applied, in order to prevent shrinking and curling.

It is an object of my invention to provide an apparatus in which reenforcing members are applied to a motion picture film held under tension.

To assist the drying of the film, especially when large capacity machines are employed, it is desirable to supply artificial drying means in the form of heat, drafts of air, or chemicals.

A further object of my invention is to provide an apparatus for assisting the drying of the newly reenforced film.

I have found it desirable under certain conditions to coat the newly applied bonding material with a coating such as powder. This not only eliminates any possibility of the edges of the reenforced film sticking together when wound on a reel, but in addition increases the useful life of the film.

It is an object of my invention to provide a means for applying a thin coating to a motion-picture film.

A further object of my invention is to provide an apparatus for removing superfluous coating material from the face of the film.

In reenforcing film by means of threads bonded to the edges thereof, it is often difficult to retain the thread on the edge and prevent it from moving to a position on the surface of the film, or becoming attached to the edge in a position other than at the center thereof.

It is an object of my invention to provide a machine capable of fastening reenforcing members to the edges of a film and centrally spaced thereon.

In certain cases it is undesirable to have the edges of a motion-picture film thicker than the film itself.

It is an object of my invention to provide an apparatus in which the thickness of an edge reenforcement is a uniform desired thickness.

Should clots of bonding material form on the faces of the film adjacent to the edge thereof, and be allowed to harden, they would set the film into vibration as it passed through a projector.

It is a further object of my invention to provide a device whereby any excess of bonding material is removed.

Further objects and advantages will be apparent from the accompanying drawings and the following description.

In the drawings I illustrate one form of my invention, but it should be understood that I do not wish to be limited to this particular form, wishing my invention to be limited only by the appended claims.

Figure 1:
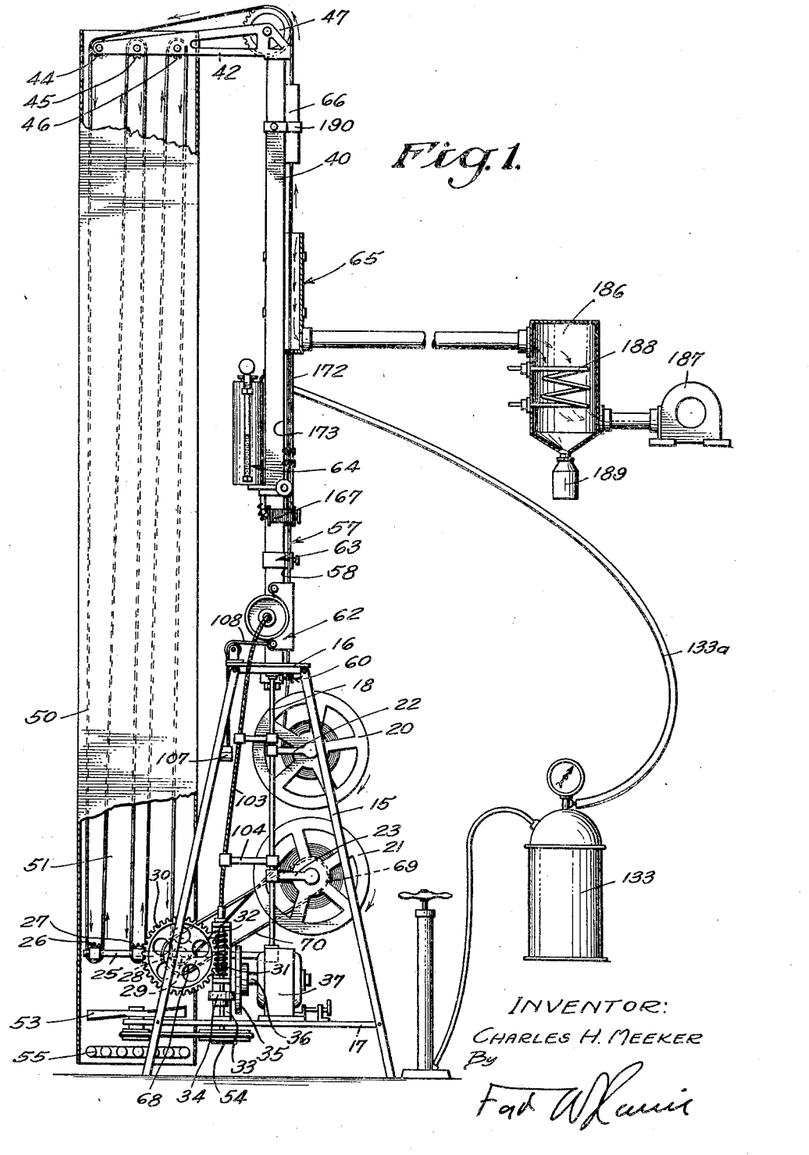
Fig. 1 is a side elevational view of my apparatus.

Fig. 1 shows a four-legged frame 15 supporting a top plate 16 and a shelf 17. Between the top plate 16 and the shelf 17, and secured to each, is a pair of vertical rods 18. An unwinding reel 20 and below it a winding reel 21, are supported on arms 22 and 23 respectively, which are in turn clamped to the rods 18.

Extending rearwardly from the rods 18 are legs 25 between which are pivotally supported two film sprockets 26 and 27, and a driving sprocket 28, the latter being fixed to a shaft 29. A worm gear 30 is mounted on the shaft 29, and meshed with the worm gear 30 is a worm 31 attached to a vertical shaft 32 which is journaled in a supporting frame 33 attached to the shelf 17. A squared portion of the vertical shaft 32 engages a driven friction plate 34 which is in contact with a driving friction plate 35 attached to the shaft 36 of a motor 37. The driven plate 34 is adapted to slide vertically on the squared portion of the vertical shaft 32, thus contacting the driving plate 35 at any desired radial distance from its center. This is a well known variable speed mechanism and allows the driven plate 34, and thus the driving sprocket 28, to be rotated at various speeds. I do not wish to limit myself to this type of friction drive, for any means of adjusting the speed of the driving sprocket 28 can be used.

Secured to, and extending vertically from, the center of the top plate 16 is a square post 40, supporting at its top a truss 42 which pivotally holds three film sprockets 44, 45, and 46 which are axially and vertically aligned with film sprockets 26, 27, and 28 respectively. A film sprocket 47 is mounted in the truss 42 so that its outer periphery extends just forward of the front face of the square post 40.

A vertical tank 50 extends downward from the truss 42 to a point just above the floor on which the frame 15 rests. The tank 50 surrounds the sprockets 26, 27, 28, 44, 45, and 46, and provides a drying space 51 for a motion-picture film which is passed around the sprockets in a manner to be described. At the bottom of the tank 50 in the drying space 51 is a drying fan 53 driven by a pulley 54 attached to the lower end of the vertical shaft 32 just beneath the shelf 17. The drying fan 53 forces a current of air upward through the tank 50. The air may be heated by means of a heating unit 55 placed below the fan 53.

A motion-picture film 57 has an emulsion 58 mounted on one face of a celluloid backing 59. The film 57 is threaded, emulsion side toward the post 40, from the unwinding reel 20, upward through a brake indicated by the numeral 60, a grinder indicated by the numeral 62, an adjustable guide 63, a bonding unit 64, an exhaust tank 65, and a talc box 66. These pieces of apparatus are mounted vertically above one another and will be described later. The film passes over the film sprockets 47, 44, 26, 45, 27, 46 and around the driving sprocket 28 after which it is wound on the winding reel 21.

A device for removing any slack in the film between the driving sprocket 28 and the winding reel 21 is provided by a pulley 68 secured to the shaft 29 of the driving sprocket 28, and a similar pulley 69 attached to the shaft to which the winding reel 21 is secured. These pulleys 68 and 69 are connected by a belt 70. Thus one revolution of the driving sprocket 28 would turn the winding reel 21 one complete revolution if the film stretched between the two be disregarded. Insofar as the diameter of the sprocket 28 is less than that of the hub of the winding reel, it follows that one revolution of the former would move the film 57 a smaller distance than one revolution of the latter. The same length of film is wound on the reel 21 as it passes the sprocket. Thus the reel 21 will necessarily turn slower than the sprocket 28, this being taken care of by the slippage of the belt 70. This action always tends to keep the film 57 taut between the sprocket 28 and the reel 21, thus winding the film tightly on the latter.

The film 57 is moved by the driving film sprocket 28 and is thus driven at a point just previous to being finally wound on the winding reel 21. The driving tension created is thus transmitted through the whole length of film up to the point where it leaves the unwinding reel 20. A braking means inserted at this point will control the tension of the entire unrolled portion of the film.

Figures 6, 7, 8, 9, 10, 11, 12:
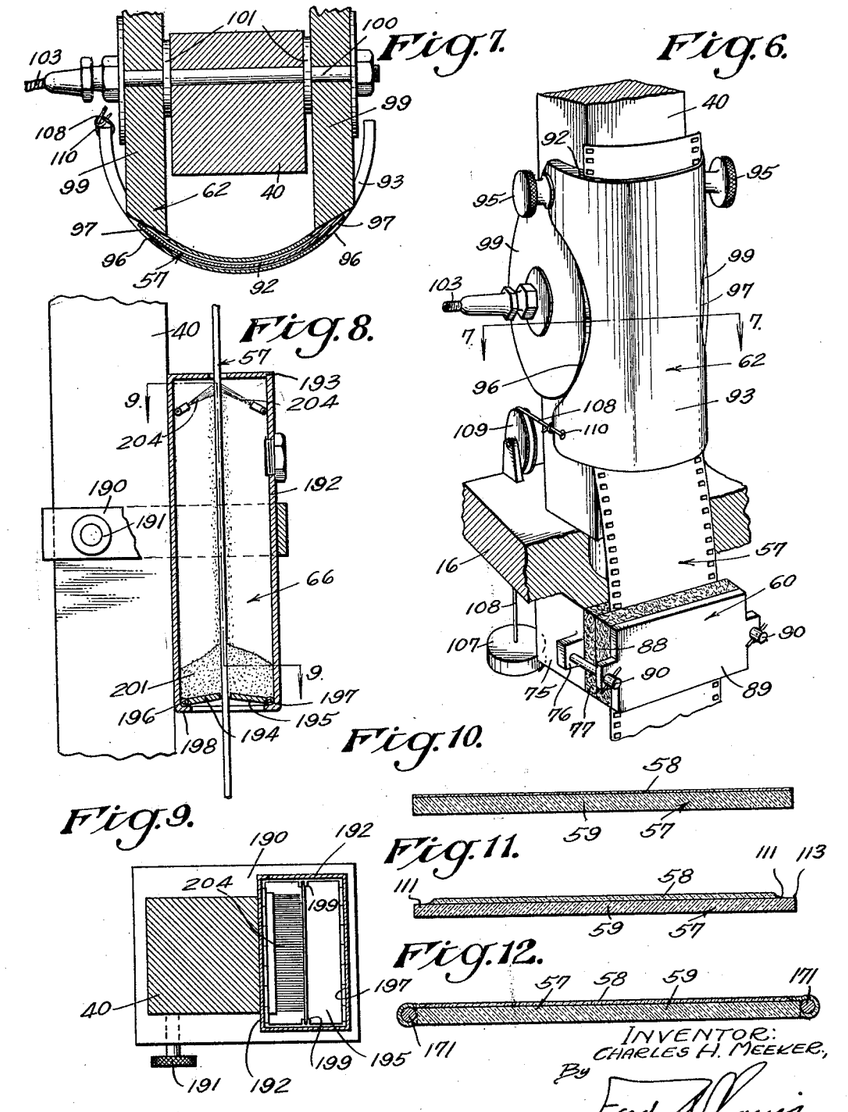
Fig. 6 is a perspective view of the grinding and braking means of my invention.
Fig. 7 is a sectional view taken on the line 7—7 of Fig. 6.
Fig. 8 is a vertical sectional view of the talc box used.
Fig. 9 is a horizontal section taken as indicated by the line 9—9 of Fig. 8.
Fig. 10 is a cross section of a film before treatment.
Fig. 11 is a cross section of a film after grinding.
Fig. 12 is a cross section of a film after the reenforcing has been applied.

Such a braking means is provided by the brake 60 which is best shown in Fig. 6. A lower projection 75 of the top plate 16 has a pair of ears 76 and holds a felt pad 77 in a vertical plane. A felt pad 88 secured on a plate 89 is mounted adjacent to the felt pad 77 by means of two adjusting screws 90 which pass through the plate 89 and are threadedly received in each ear 76 of the lower projection 75. The film 57 passes upward between the pads 77 and 88. Tightening the adjusting screws 90 allows any desired braking action to be exerted on the movement of the film and consequently any desired amount of tension in the film 57 as it passes through the apparatus.

Passing upward from the brake 60 the film 57 proceeds through the top plate 16 and through an annular longitudinal channel 92 of the semi-cylindrical guide 93 of the grinder 62. The guide 93 is pivoted at its upper end to the sides of the square post 40 by two thumb screws 95 which pass through the upper corners of the guide. An arcuate channel 96 is cut in each side of the guide 93 to such a depth that the annular longitudinal channel 92 is intersected. The edges 97 of the film 57 are exposed as the film 57 passes through the annular longitudinal channel 92, as clearly shown in Figs. 6 and 7.

While thus exposed, the emulsion 58 adjacent to the edges 97 of the film 57 is contacted by a pair of beveled grinding wheels 99 which are secured to a shaft 100 journaled in the square post 40 and separated therefrom by washers 101. A flexible drive link 103 is connected to the shaft 100 and to the upper end of the vertical shaft 32 of the film driving mechanism previously described. The drive link 103 is suitably journaled in guides 104 attached to one of the rods 18.

The pressure between the emulsion 58 of the film 57 and the grinding wheels 99 is regulated by a weight 107 attached to a cord 108 which passes over a pulley 109 rotatably secured to the top plate 16, the cord 108 being attached to the lower end of the guide 93 as indicated by the numeral 110. Increasing the weight 107 exerts a rearward pull on the bottom of the guide 93. This guide pivots about the thumb screws 95, thus bringing the emulsion of the film 57 into closer contact with the grinding wheels 99.

The angle between the grinding surface of the wheels 99 and the tangent to the film 57 at the edge thereof is relatively small so that a corner of the emulsion 58 is ground away as the film 57 passes through the grinder, leaving exposed a surface of the celluloid backing 59 of the film 57 as indicated at 111. This portion 111 presents a clean celluloid surface to the action of the bonding material later to be applied to hold the reenforcing threads in place.

This grinding operation is clearly shown by comparing Fig. 10 with Fig. 11. Fig. 10 is a cross section of a film 57 showing the emulsion 58 and the celluloid backing 59, before grinding. Fig. 11 shows a cross section of the same film after grinding. Here the faces of the emulsion 58 adjacent to the edges 97 have been removed, exposing the celluloid of the film itself. While the grinding wheels 99 do not have grooved or ridged outer faces, I have found that an arrangement such as shown grinds the film as indicated in Fig. 11, the emulsion being removed a distance back from the edge, and the newly formed inclined edge of the emulsion being cup-shaped. Furthermore, the grinding wheels seem not to penetrate the celluloid backing itself, leaving a relatively square corner on it, as indicated at 113.

Figures 2, 3, 4, 5, 13:
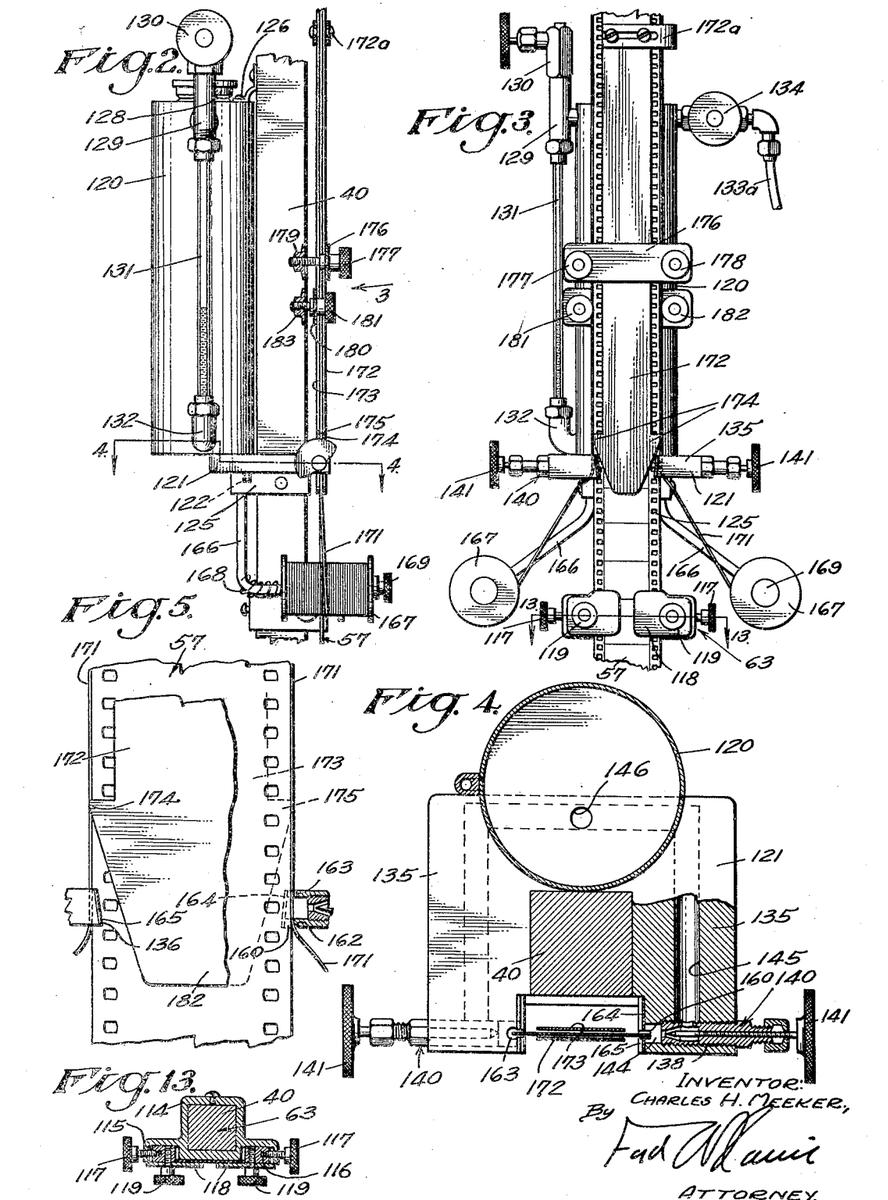
Fig. 2 is a side view of the bonding unit of my invention.
Fig. 3 is a front view of the bonding unit taken in the direction of the arrow 3 of Fig. 2.
Fig. 4 is a section taken along the line 4—4 of Fig. 2.
Fig. 5 is an enlarged view, partially sectioned, of a portion of Fig. 3.
Fig. 13 is a section taken on the line 13—13 of Fig. 3.

From the grinder 62 the film passes upward through the adjustable guide 63. As best shown in Fig. 13, this guide has a collar 114 which surrounds, and is secured to, the square post 40. The collar 114 provides horizontal grooves 115 to the right and to the left of the square post 40. Blocks 116 are adapted to slide horizontally in the grooves 115, their position being controlled by screws 117 which are pivoted therein, and which are threaded through a portion of the collar 114 as shown in Fig. 13. The film 57 passes through a channel bounded by the front face of the collar 114, the inner edges of the blocks 116, and two front plates 118, each or the front plates 118 being secured to one of the blocks 116 by screws 119. The front of the collar 114 and the front plates 118 thus determine the plane of the film 57, while the sidewise position of the film 57 is determined by the blocks 116.

Secured to the square post 40 above the guide 63 is the bonding unit 64 which applies the reenforcing members to the edges of the film 57 as it passes therethrough. The bonding unit 64 has a tank 120 secured to a base plate 121. The plate 121 has a pin 122 which sits in a recess in a collar 125 which is in turn clamped to the post 40. The upper end of the tank 120 is held adjacent to the square post 40 by means of a spring clamp 126.

At the top of the tank 120 is a filling opening closed by a cap 128. A T-fitting 129 communicates with the top interior of the tank 120 and has a pressure release valve 130 extending upward therefrom. The lower end of the T-fitting holds the upper end of a level-gage glass tube 131. The lower end of this glass tube communicates with the lower interior of the tank through an L-fitting 132.

A pressure tank 133 supplies pressure to the top of the tank 120 through a hose 133ᵃ connecting the pressure tank 133 and a valve 134 at the top of the tank 120. The tank 120 holds a supply of liquid bonding material, the height of which is at all times indicated by the level gage.

As a bonding material any liquid adhesive may be used. I prefer to use a celluloid solvent, however, and more particularly a solution of celluloid in amyl acetate and acetone together with a small amount of butyl phthalate. A bonding material containing dissolved celluloid, and capable of dissolving celluloid, forms a unitary bond with the celluloid backing 59 of the film, so that when dry the bonding material and the film backing 59 are a unitary mass. A bonding material which I have found most satisfactory is made by mixing 275 c. c. acetone, 275 c. c. amyl acetate, 50 g. celluloid, and 7.5 g. di-butyl phthalate.

The base plate 121 has a pair of legs 135 which extend forward of the post 40 and snugly engage the two side faces thereof as indicated best in Fig. 4. The inner surfaces of the front portions of the arms 135 are cut on a slant as indicated by the numeral 136 in Fig. 5, so that the bottom edges of the arms 135 are closer together than the upper edges.

Each arm 135 is drilled and tapped at 138 to receive a needle valve 140 controlled by a knurled knob 141. The needle valve 140 does not extend to the inner edge of the arm 135, but stops short of it, leaving a well 144 at the inner edge of the bore. A bore 145 through each arm 135 is in communication with the interior of the tank 120 through an opening 146 in the bottom thereof. The needle valves 140 can be of any construction which allows a control of the amount of bonding fluid passing from the bores 145 into the wells 144.

A vertical slot 160 is cut in the metal of each arm 135 at the bottom of the wells 144. These slots receive the edges of the film 57 and are of a width slightly greater than twice the thickness of the film in order to allow patches to pass, and the distance from the bottom of one slot to the bottom of the corresponding slot of the other arm is from one-sixteenth to three-sixteenths of an inch greater than the width of the film used. These dimensions are not invariable and are given merely to clarify the description, and I do not wish to be limited to these distances.

The lower corners 162 at the base of the slots 160 are rounded slightly as shown in Fig. 5 in order more easily to pass the reenforcing thread in a manner to be described.

Directly above each slot 160 a hole 163 is drilled through the metal at the top of the wells 144. The holes 163 are approximately tangential to the inner upper surfaces of the front portions of the arm 135 as shown in Figs. 4 and 5.

Each well 144 is closed by two thin plates 164 and 165 mounted on the slanting surface 136 with their edges spaced a distance apart equal to the width of the vertical slot 160.

Extending below and outward from the lower collar 125 are two arms 166, which are bent forward at their lower ends to each pivotally support a spool 167. Each spool 167 is held between a compression spring 168 secured to the arm 166, and a thumb screw 169 screwed onto the end of each arm 166. By tightening the thumb screw 169 the spool 167 is acted on by a braking means through being compressed between the spring 168 and the thumb screw 169.

Wound on the spools 167 is a reenforcing thread 171. This thread may be of any material with twisted or untwisted fibres, and may be saturated with a solution of bonding material or may contain no bonding material. The thread 171 passes upward around the corner 162 of the base plate 121, whence it passes upward through the vertical slot 160, the well 144 and through the hole 163. The edges of the film 57 simultaneously pass upward through the vertical slot 160, the well 144, the hole 163, and through the slot separating the plates 164 and 165, its sidewise position being adjustably determined by the guide 63.

When the machine is in operation the wells 144 are filled with bonding material and in passing through these wells the thread 171, the edge of the film 57, and the sides adjacent to the edges are all wetted with bonding material.

Feeding the threads toward the film is important in that the slight sideward pulling force tending to separate the string and the edge of the film keeps the thread centered on the edge of the film instead of allowing it to creep toward the front or rear of the film or, in some cases, leaving the edge of the film and emplanting itself on a face thereof. This slight sideward pull tending to separate the thread from the film is easily resisted by the cohesive action of the bonding material which saturates the thread and the film edge. This cohesive action, together with surface tension, also tends to draw the thread into intimate contact with the edge of the film.

Extending upward and secured to the exhaust tank 65 are front and rear film-guiding members 172 and 173 respectively. These film-guiding members are thin flexible plates of a width slightly greater than the frames of the film 57. They are held a distance apart which is slightly greater than twice the thickness of the film, being thus spaced by spacers 172ª. The lower ends of the film-guiding members 172 and 173 terminate adjacent to the lower collar 125 and have pairs of wipers 174 and 175 extending therefrom. These wipers extend outward from the body of each guiding member to the outer edge of the reenforcing thread 171, as shown in Fig. 5.

Attached to the front film-guiding member 172 is a cross plate 176 which pivotally carries screws 177 and 178 which in turn are threaded in bosses 179 formed on each side of the post 40. By adjusting these screws the position of the lower end of the film-guiding member 172 can be varied.

A similar cross plate 180 is carried by the rear film-guiding member 173 and pivotally holds two screws 181 and 182 which thread into bosses 183 formed on each side of the post 40 and allow the position of the lower end of the rear film-guiding member to be adjusted. In operation, the screws 177, 178, 181, and 182 are adjusted so that the wipers 174 and 175 of the two film-guiding members lightly touch the front and rear faces of the film. As the film moves upward these wipers remove any excess of bonding material which would tend to thicken the edges of the film. As this excess bonding material forms on the lower edges of the wipers, it hardens and eventually bridges the gap between the wipers and the base plate 121. This bridge can easily be removed if desired, but I have found that it in no way affects the success of the above described operation.

By adjusting the distance between the pairs of wipers 174 and 175, the thickness of the bonding material on the edge of the film can be varied. For instance, if the screws 177, 178, 181, and 182 were to be adjusted to increase the distance between the lower ends of the film-building members, and consequently between the pairs of wipers, less of the bonding material will be removed by these wipers and the edges of the film will be reenforced with a thickness of bonding material which is greater than the thickness of the film. By decreasing the spacing of the wipers the reenforcing edge can be reduced to a thickness equal to the film itself. In the event that a thick edge is desired, the speed of the film can be decreased or the needle valves 140 can be adjusted to supply a greater amount of bonding material.

Fig. 12 shows a cross section of the reenforced film after leaving the bonding unit 64. The reenforcing threads 171 are firmly embedded in the bonding material. By using a bonding material containing dissolved celluloid the reenforcing means forms a part of the film itself by cohering to the celluloid backing 59 and hardening into a mass unitary therewith. The grinding operation clears the emulsion from a surface of the celluloid backing 59 as previously described, thus offering an additional surface of celluloid to the action of the bonding material. It should be noticed in Fig. 12 that the corners of the emulsion 58 which were removed by the grinder are replaced by bonding material.

Secured to the post 40 directly above the bonding unit 64 is the exhaust tank 65 which forms a vertical passage through which the film rises. The vertical passage is connected to the upper end of a reclaiming tank 186 by means of a pipe as indicated diagrammatically in Fig. 1. The lower end of the declaiming tank is connected to an exhaust fan indicated by the numeral 187. The exhaust fan is suitably driven by means not shown, and draws a current of air through the vertical passage of the exhaust tank 65, past the film 57 therein, and through the reclaiming tank 186.

The solution used to dissolve the celluloid in forming the bonding material is highly volatile and evaporates shortly after being exposed to the atmosphere, in some instances forming explosive vapors. The exhaust tank 65 removes practically all of these vapors, carrying them through the reclaiming tank 185. It should be understood that the exhaust tank could be made as long as desired and could completely surround the bonding unit if desired, without departing from the spirit of my invention. Its object is to remove the vapors and assist in the drying of the film.

Disposed in the tank 186 is a refrigeration coil 188 which is adapted to suddenly cool the vapors passing through the reclaiming tank. This sudden cooling condenses these vapors on the outer surface of the refrigeration coil 188, from which the condensates drip into a suitable receptacle 189. These condensates can be used over and over again in making more bonding material. I have found that in excess of 80 per cent of the solution used in dissolving the celluloid in making the bonding material can be recovered and reused. This is especially true if a similar exhaust and condensation means is employed for the fumes in the drying tank 50. In so far as these materials are usually expensive, a considerable saving in cost results from a recovery of what might otherwise not only go to waste, but prove a menace to the safe operation of the machine.

Mounted on the post 40 by a band 190 above the exhaust tank 65 is the talc box 66. The position of the talc box 66 on the post 40 can be adjusted by loosening the set screw 191 which is threadedly received by the band 190 and which bears against the post 40. The talc box 66 has walls 192 and a slotted cover 193. Two trap doors 194 and 195 are hinged at 196 and 197 to the front and rear walls 192. When in their horizontal position resting on stops 198, these doors effectively meet, and close the opening at the bottom of the walls 192 with the exception of two small holes, half of each hole being formed by a notch 199 cut in each end of the doors 194 and 195. The film 57 raises the inner edges of the doors as it passes therethrough, these inner edges lightly contacting the front and rear surfaces of the film.

The openings formed by the notches 199 allow the reenforced edges of the film to pass through untouched by the trap doors 194 and 195. The space inside the walls 192 contains a talc powder 201 which rests on the trap doors 194 and 195. As the film 57 rises, a coating of the powder 201 is applied to all portions of it, including the still partially wet edge reenforcement.

A pair of brushes 204 are hinged to the front and rear walls 192 and lean against the faces of the film 57 as it passes. The brushes 204 are of such a width as to brush only the picture and sprocket-hole portions of the film 57, allowing the reenforced edges to go unbrushed. The film 57 passes through the slotted top and over the film sprocket 47 as before described.

I prefer to use a talc as a coating medium in the talc box 66. This talc is effectively applied to the film by passing it through the pile of powder 201, and the excess is dusted from the central portion of the film by the brushes 204, this excess dropping again onto the pile 201. This talcing operation not only prevents the reenforced edges of the film from sticking should they contact anything before thoroughly dry, but also adds to the useful life of the film by acting as a lubricant when the film passes through a projector.

It is within the scope of my invention to use any material for coating the film which will tend to make the reenforcing members less sticky or to dry them, and I do not wish to be limited to the use of a talc powder.

In operating my invention a portion of film 57 is threaded through the apparatus as previously described, or a length of film to be reenforced may be joined to a film already in the machine. The threads 171 are threaded through the bonding unit as previously described, and each is tied through a sprocket hole of the film 57. The tank 120 is filled with a bonding material and the valve 134 opened, thus applying pressure to the upper surface of the bonding material in the tank 120. The needle valves 140 are carefully adjusted by means of the thumb screws 141 to supply the desired amount of bonding material to the wells 144 of the base plate 121.

The motor 37 is then energized, thus turning the driving sprocket 28, the winding reel 21, the drying fan 53, and the grinder 62. As the sprocket 28 revolves it pulls the film from the unwinding reel through the brake 60. The brake 60 applies a tension to the entire film between the driving sprocket 28 and the brake 60. As the film rises, the grinder 62 removes the edges of the emulsion 58, and the bonding unit applies bonding material to the edges of the film and to the reenforcing thread moving along with the film, finally uniting the thread and the film by means of the bonding material. Any excess bonding material is removed by the wipers 173 and 174. The bonding material dries quickly and is partially dried in the exhaust tank 65 before it reaches the talc box 66. After receiving its coating of talc the film passes upward and downward through the vertical tank 50 where it is completely dried by a stream of heated air sent upward by the drying fan 53. The film 57 after being thoroughly dried, is wound on the winding reel 21.

The speed of the machine can be controlled by means of the friction discs 34 and 35 which not only vary the speed of the film, but simultaneously the speed of the drying fan 53 and the grinder 62. The amount of emulsion removed from the faces of the film 57 adjacent to the edges is controlled by the amount of the weight 107. The amount of bonding material applied is controlled by the needle valve 140 and the amount of pressure in the tank 133. Finally the tension of the thread can be regulated by means of the thumb screws 169.

When the machine is stopped the valve 134 is closed, the pressure release valve 130 is opened, and the needle valves 140 closed, thus keeping the bonding material remaining in the tank 120 sealed, and the pressure on it approximately atmospheric.

From the foregoing, the advantages of my apparatus are obvious. I do not wish my invention to be limited to the form of apparatus shown, for obviously different embodiments of it could be used. For instance, any braking means could be used in place of the felt pads 77 and 88. So also, any means of driving the grinder and adjusting the tension thereof, as well as other forms of abrasive apparatus might be used to accomplish my purpose.

It is within the scope of my invention to place the spools 167 of thread 171 in a bath of bonding material, or in any other way to first saturate the thread with bonding material before applying it to the film 57. Furthermore other bonding units 64 might be mounted on the post 40 and the rising film subjected to successive reenforcing operations. For instance, a lower bonding unit might coat the edge of the film with bonding material and apply a saturated or unsaturated thread, and a second bonding unit might apply a further coat of bonding material.

Neither do I wish my invention to be limited by the path of the film 57 shown. The film 57 may be run up several hundred feet before being bent over a sprocket and the drying means may be applied just after the film has been reenforced and before it is bent, thus keeping it straight while drying.

It is also within the scope of my invention to extend the film-guiding members 172 and 173 upward through the exhaust tank 65 and the talc box 66, in which case the brushes 204 may be dispensed with, inasmuch as no talc would then be applied to the picture portions, or frames, of the film.

I have found it advantageous in certain applications of my invention to saturate only the thread with the bonding material, and subsequently bringing the saturated thread into contact with the dry edge of the film, allowing it to dry in place. Thus I do not wish to be limited to the wetting of both thread and film edge in reenforcing the film.

I claim as my invention:

1. A device adapted to apply a reenforcing member to a film comprising: means for guiding said reenforcing member along an edge of said film in the plane thereof; and means for supplying a bonding material to said film and said reenforcing member for securing them together.

2. In a device for reenforcing motion-picture film, the combination of: means for removing the emulsion adjacent to the edges of a motion-picture film; means for guiding a thread into a position adjacent to the edge of said film; and means for supplying a bonding material to said film and said thread for securing them together.

3. In a device for reenforcing motion-picture film, the combination of: means for removing the emulsion adjacent to the edges of a motion-picture film; means for guiding a thread toward the edge of said film and at an angle thereto; and means for supplying a bonding material to said film and said thread for securing them together.

4. In a device for reenforcing motion-picture film, the combination of: means for removing the emulsion adjacent to the edges of a motion-picture film; means for guiding a thread into a position adjacent to the edge of said film; means for supplying a bonding material to said film and said thread for securing them together; and means for removing any excess of bonding material.

5. In a device for reenforcing motion-picture film, the combination of: means for removing the emulsion adjacent to the edges of a motion-picture film; means for guiding a thread into a position adjacent to the edge of said film; means for supplying a bonding material to said film and said thread for securing them together; and means for drying said film.

6. In a device for reenforcing motion-picture film, the combination of: means for removing the emulsion adjacent to the edges of a motion-picture film; means for guiding a thread into a position adjacent to the edge of said film; means for supplying a bonding material to said film and said thread for securing them together; and means for controlling the amount of bonding material applied.

7. A device adapted to apply a reenforcing member to a film comprising: automatic means for removing a portion of the emulsion of said film; means for guiding said reenforcing member into a position adjacent to said film; means for supplying a bonding material to said film and said reenforcing member; and means for joining said reenforcing member to said film.

8. A device adapted to apply a reenforcing member to a film comprising: means for moving the film through the device; means operative simultaneously with the movement of the film for removing a portion of the emulsion therefrom; means for guiding said reenforcing member into a position adjacent to said film; and means for supplying a bonding material to said film and said reenforcing member.

9. A device adapted to apply a reenforcing member to a film comprising: means for continuously moving the film through the device; means operative by the movement of said film for removing a portion of the emulsion therefrom; means for guiding said reenforcing member into a position adjacent to said film; means for applying a bonding material to said film and said reenforcing member; and means for joining said reenforcing member to said film.

10. A device adapted to apply a reenforcing member to a film comprising: means for continuously moving the film; means operative by the movement of the film for removing a portion of the emulsion therefrom; means for guiding said reenforcing member into a position adjacent to said film; means for applying a bonding material to the uncovered portion of said film; and means for attaching said reenforcing member to said film.

11. A device adapted to apply a reenforcing member to the edge of a film comprising: means for moving a film through said device; means operative by the movement of said film for removing a portion of the emulsion therefrom; guide means for guiding said reenforcing member into a position adjacent to the edge of said film; means for applying a bonding material to the edge of said film and to said reenforcing member; and means for attaching said reenforcing member to said film.

12. A device adapted to apply a reenforcing member to a film comprising: means for continuously moving the film; means actuated simultaneously with the movement of the film for removing a portion of the emulsion therefrom; means for guiding said reenforcing member into a position adjacent to said film; and means for applying a bonding material to said uncovered edge of said film and to said reenforcing member for securing them together.

13. A device for reenforcing film comprising: means for moving the film through said device; means for removing a portion of the emulsion from the edge of the film during the movement of said film; means for guiding said reenforcing member into a position adjacent to said film; and means for applying a bonding material to the edge of said film and to said reenforcing member.

14. A device for reenforcing film comprising: mechanism for moving a film through said device; means actuated simultaneously with the movement of the film for removing a portion of the emulsion from said film; means for guiding a reenforcing member into a position adjacent to said film; and means for applying a bonding material to said film and said reenforcing member.

15. A device for reenforcing film comprising: mechanism for continuously moving a film through said device; means operable by the movement of the film for removing a portion of the emulsion therefrom; a reenforcing member adapted for attachment to the edge of said film; means for guiding said reenforcing member into a position adjacent to said film; means for applying a bonding material to the uncovered portion of said film and to said reenforcing member; and means for regulating the amount of said bonding material supplied to said film and to said reenforcing member.

16. A device for reenforcing film comprising: a mechanism for continuously moving a film through the device; means for guiding a reenforcing member into a position adjacent to the edge of said film; means for supplying a bonding material to said film and reenforcing member for securing them together; and means for regulating the amount of bonding material to be supplied to said film and reenforcing member.

17. A device for reenforcing film comprising: a mechanism for moving or advancing a film to be reenforced; means for guiding a reenforcing member into a position adjacent to said film; braking means for said film and reenforcing member; means for supplying a bonding material to said film and reenforcing member; and means for removing excess bonding material from said film and reenforcing member.

18. A device for attaching a reenforcing member to a film comprising: a mechanism for advancing a film to be reenforced, said reenforcing member adapted for connection to an edge of said film; means actuated by the movement of said film for removing a portion of the emulsion therefrom; means for applying a bonding material to said film and reenforcing member for connecting them together; braking means for said film and reenforcing member; and means for regulating the amount of bonding material that is to be applied to said film and reenforcing member.

19. In a device for reenforcing motion-picture films, the combination of: means for removing emulsion adjacent to a longitudinal edge of said film; means for guiding a thread in a plane parallel to said edge of said film; and means for supplying a bonding material to said film and said thread for securing them together.

20. In a device for reenforcing motion-picture film, the combination of: means for removing emulsion adjacent to a longitudinal edge of said film; means for guiding a reenforcing thread toward said edge of said film and at an angle thereto; and means for supplying a bonding material to said film and said thread for securing them together.

21. In a device for reenforcing motion-picture film, the combination of: means for removing emulsion adjacent to a longitudinal edge of said film; means for guiding a thread into a position parallel to said edge of said film; means for supplying a bonding material to said edge of said film and said thread and securing them together; and means for removing an excess of bonding material.

22. In a device for reenforcing motion-picture film, the combination of: means for removing emulsion adjacent to a longitudinal edges of said film; means for guiding a thread into a position adjacent to an edge of said film; means for supplying a bonding material to said film and said thread; and means for controlling the amount of bonding material applied.

23. In a device for reenforcing motion-picture film, the combination of: means for guiding a reenforcing thread in a plane parallel to a longitudinal edge of said film; means for supplying a bonding material to said edge of said film and said thread; and means for attaching said thread to said edge of said film.

24. In a device for reenforcing motion-picture film, the combination of: means for guiding a reenforcing thread in a plane parallel to an edge of said film; means for supplying a bonding material to said thread; and means for attaching said thread to said edge of said film.

25. In a device for reenforcing a motion-picture film, the combination of: means for guiding a reenforcing thread into a position adjacent to a longitudinal edge of said film; and means for supplying a bonding material to said edge of said film and said thread, said guiding means effecting the bonding of said thread to said edge of said film.

26. In a device for reenforcing motion-picture film, the combination of: means for moving a film through said device; guide means for guiding a reenforcing thread in a plane parallel to an edge of said film; and means for supplying a bonding material to said edge of said film and said thread, said film moving means cooperating with said guide means to cause the bonding of said thread and said film.

27. In a device for reenforcing motion-picture film, the combination of: means for continuously advancing a film through said device; guide means associated with said advancing means for guiding a reenforcing thread into a position adjacent an edge of said film; and means for supplying a bonding material to said film and said thread, said film advancing means cooperating with said guide means to connect said thread to said film edge.

In testimony whereof, I have hereunto set my hand at Riverside, California, this 2nd day of October, 1928.

CHARLES H. MEEKER.